United States Patent
Brown

(10) Patent No.: US 7,237,763 B2
(45) Date of Patent: Jul. 3, 2007

(54) ELECTRICAL FISH TAPE

(76) Inventor: Ricky Eugene Brown, 212 Johnson La., Piedmont, SC (US) 29673

(*) Notice: Subject to any disclaimer, the term of this patent is extended or adjusted under 35 U.S.C. 154(b) by 151 days.

(21) Appl. No.: 11/204,663

(22) Filed: Aug. 16, 2005

(65) Prior Publication Data

US 2007/0040156 A1 Feb. 22, 2007

(51) Int. Cl.
*H02G 1/08* (2006.01)
(52) U.S. Cl. ............... 254/134.7; 254/134.3 FT
(58) Field of Classification Search ............ 254/134, 254/134.3 R, 134.7, 134.3 FT
See application file for complete search history.

(56) References Cited

U.S. PATENT DOCUMENTS

| | | | |
|---|---|---|---|
| 2,750,151 A * | 6/1956 | Fowler et al. | ...... 254/134.3 FT |
| 4,171,123 A | 10/1979 | Woelkers | |
| 4,411,409 A * | 10/1983 | Smith | ............... 254/134.3 FT |
| 4,596,381 A | 6/1986 | Hamrick | |
| 4,895,221 A | 1/1990 | Carlson | |
| 5,505,432 A | 4/1996 | Noonan | |
| 6,254,026 B1 * | 7/2001 | Tsai | ..................... 242/390.2 |

* cited by examiner

*Primary Examiner*—Jacob K. Ackun, Jr.
(74) *Attorney, Agent, or Firm*—J. Herbert O'Toole; Nexsen Pruet, LLC

(57) ABSTRACT

An apparatus that attaches to the end of the electrical fish tape to eliminate or reduce drag and friction while the fish tape is pushed through bends in electrical pipe with a roller attached to the end of an electrical fish tape or snake to drastically reduce friction and drag when the fish tape or snake is being pushed through bends in electrical pipe. The roller is designed to rotate when coming into contact with the inner pipe wall at any position. Inner bearing further magnifies roll, takes advantage of the flat side of the fish tape to position the roller going into and through the bend for optimum roll.

8 Claims, 2 Drawing Sheets

ELECTRICAL FISH TAPE

BACKGROUND OF THE INVENTION

1. Field of the Invention

This application is directed to an apparatus that attaches to the end of an electrical fish tape to eliminate or reduce drag and friction while the fish tape is pushed through bends in electrical tubing.

2. Background and Prior Art

This invention relates generally to the field of electrical wiring installation and more specifically to an apparatus that attaches to the end of an electrical fish tape to eliminate our reduce drag and friction while the fish tape is pushed through bends in electrical tubing.

When installing electrical wire in conduit tubing, two things limit the distance between pull points in the tubing in an exposed industrial piping application. One is the length of the fish tape or snake. If the fish tape measures 200 feet, the pull points will be placed less than 200 feet part. For example, pull points could be placed at 180 feet intervals to ensure that the fish tape exposed sufficiently for manipulation at each end. The second aspect is the degree of bend between pull points. For example, a total of 360 degrees of bend is the extreme maximum bend between pull points. Typically installers will only put 270 degrees between pull points. If the bend is required to exceed 270 degrees, a junction box or condulet is installed as a pull point at every 270 degree interval. These junction boxes and condulets, which are used for pull points, drive up the cost of electrical installation, not only for the price of materials, which can be expensive, but the time for the initial wire pull and future pulls in the wire way because both points have to be manned to pull wire, which affects the cost of labor. It is difficult to push a fish tape through 360 degrees. After 270 degrees of bend is achieved, A-90 allows the end of the fish tape to roll through another bend with minimum resistance from friction/drag.

The most widely known method of getting a pull lead inside an electrical conduit at present is the fish tape itself. The fish tape is bent on the lead end in such a manner as to make the tip rounded. Many commercial fish tapes today have factory ends that accomplish the same end. Some fish tapes have a flexible metallic leader approximately 18" long, but this leader is still subject to the same friction and drag inside the pipe and is not a solution to the underlying problem.

Numerous attempts to address the aforementioned problem have been patented. U.S. Pat. No. 4,171,123 to Woelkers is directed to a fish-shaped hanger for attaching multiple wire separately to a fish tape.

U.S. Pat. No. 4,596,381 to Hamrick utilizes a bag as the head of a fish tape and uses pressure differences between entry point and destination to urge the tape onward.

U.S. Pat. No. 4,895,221 to Carlson employs a sponge or foam material as a carrier for a lubricant near the head of the fish tape to decrease drag at bends.

U.S. Pat. No. 5,505,432 to Noonan discloses a fish tape head including an anti-snagging device in the form of a roller means disposal between the arms of a yoke.

The art continues to lack a low friction fish tape head which easily pushes through multiple conduit angles regardless of the orientation of the flat tape to the direction of the turn.

BRIEF SUMMARY OF THE INVENTION

The primary object of the invention is to allow the electrician to push the fish tape further and easier through bends in electrical pipe.

Another object of the invention is to eliminate some of the pull points (junction box, condulets, etc.) which have no other use.

A further object of the invention is to reduce cost of labor on installation, maintenance, and upgrade to more carriers.

Yet another object of the invention is to reduce stress on wiring due to sharp radius bends in the pulled wire.

These and other objects and advantages of the present invention will become apparent from the following descriptions taken in connection with the accompanying drawings, wherein, by way of illustration and example, an embodiment of the present invention is disclosed.

In accordance with a preferred embodiment of the invention, there is disclosed an apparatus that attaches to the end of an electrical fish tape to eliminate or reduce drag and friction while the fish tape is pushed through bends in electrical pipe comprising a roller carried on an attachment to the end of an electrical fish tape or snake; a flat, locking attachment design which takes advantage of the flat side of the fish tape to optimize roller positioning when entering and passing through the bend; a roller designed to roll upon on any contact with the inner pipe wall at any position contacted. Optionally, a friction reducing device such as a bearing or bushing is affixed to the roller at the axle line to reduce friction between axle and roller.

DETAILED DESCRIPTION OF THE INVENTION

Figure 1:
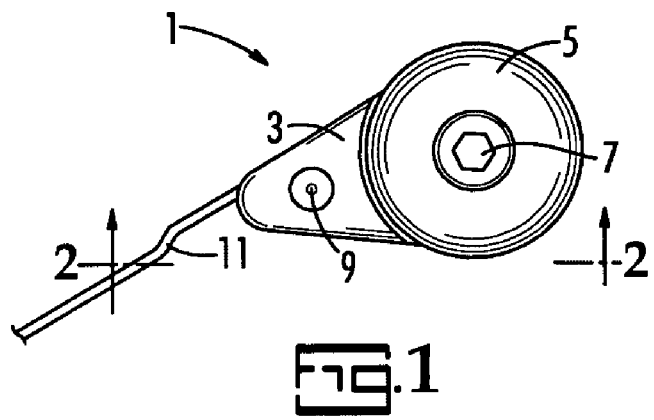
FIG. 1 is a side view of the fish tape adaptor according to this invention.

As shown in FIG. 1, which is a side view, the adaptor 1 of this invention consists of a carrier 3 for hemispheres of a roller 5 carried on an axle 7 passing through the hemispheres of the roller 5 and a portion of carrier 3 which separates the hemispheres. At the portion of the adaptor distal to the rollers is a pivot 9 around which the end of fish tape 11 is wrapped while the tape is being pushed through conduit.

Figure 2:
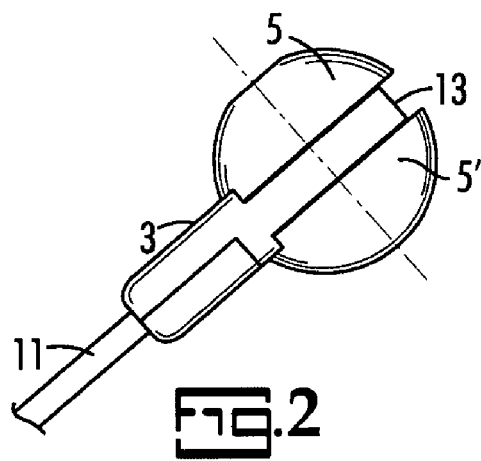
FIG. 2 is a top view of the fish tape adaptor according to this invention.

When viewed at 90° to FIG. 1, the adaptor as shown in FIG. 2 is seen to carry the hemispheres 5, 5' of the roller on a straight extension 13 of carrier 3 in line with the fish tape 11.

Figure 3:
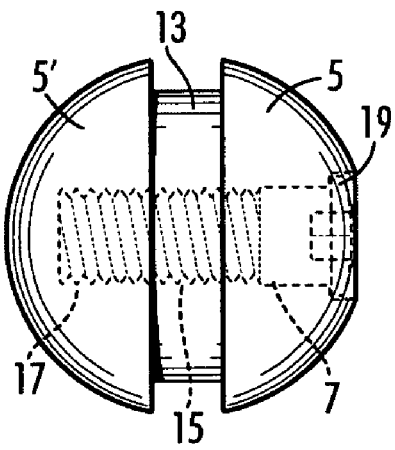
FIG. 3 shows the two hemispheres of the roller portion of this invention.

FIG. 3 shows the mounting of hemispheres 5, 5' on extensions 13 using an axle 7 which in this embodiment is a threaded bolt which screws into a threaded blind bore 17 in hemisphere 5'. Preferably the axle is set into a depression 19 of hemisphere 5. The axle my be tightened using an hex key or other conventional recessed drive means.

Alternative means for securing the axle is hemisphere 5' may be employed. For example, the axle may be formed as an extension of hemisphere 5 and attach to hemisphere 5' using an interference fit or elastic ring.

Figure 4:
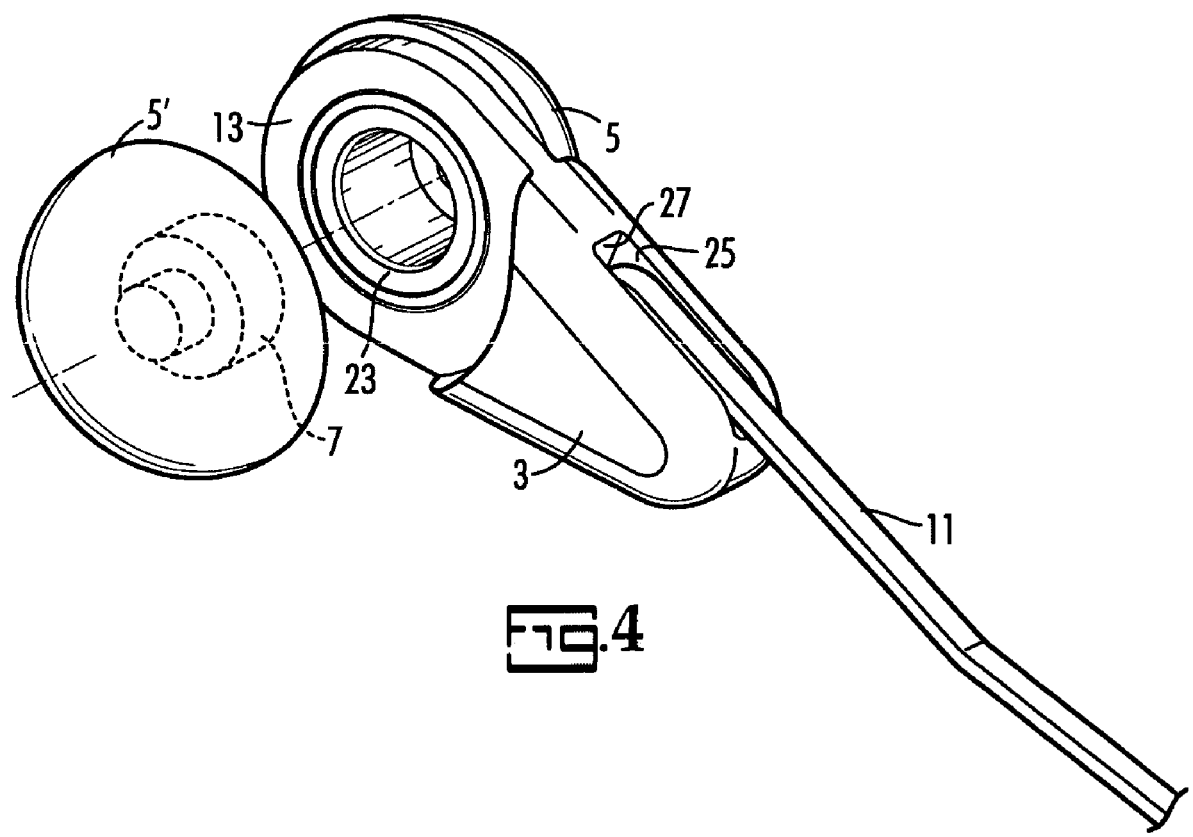
FIG. 4 shows the adaptor which carries the roller portion and the attachment for the tape.

FIG. 4 illustrates an embodiment of the invention wherein a friction reducing insert 23 is mounted into extension 13. Axle 7 is in contact with the insert to reduce resistance to turning of the roller in acute bends or when fishing through BX or Greenfield. The friction reducing insert may be a bushing such as a Teflon® bushing, a graphite impregnated porous metal or a bearing such as a needle or ball bearing.

Figure 5:
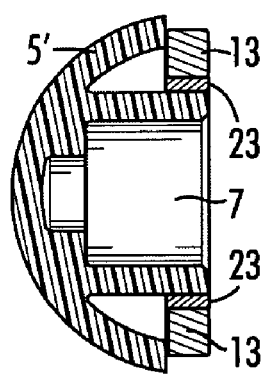
FIG. 5 shows a hemisphere of a roller and the location for a friction reducing device.

As shown in FIG. 5, the friction reducing material is preferably the same width as extension 13.

The mounting of the fish tape 11 is preferably as shown in FIG. 4. Carrier 3 has a slot 25 with pivot 9 mounted therein. The fish tape 11 is bent to form a hook and inserted into slot 25 at an angle so that the hook engages pivot 9. The fish tape is then lifted to hook the pivot. When the tape is pushed, the outer surface of the bent tape pushes against carrier 3 at the front wall 27 of slot 25. The apparatus may be withdrawn by pulling on the tape which is engaged with the pivot. Turning the top can then be employed to improve the angle of attack in tight bends. For security, a loop of electrician's tape may be used to secure the tape to the adaptor.

When the fish tape has been fished through the conduit or one of the runs, the adaptor is disengaged and a wire or wires are looped through the hook in the tape. This too should be secured with electrician's tape, as is conventional.

The adaptor of this invention may be made from any metal or hard plastic, wood, or ceramic. For matters of cost, engineering plastics are preferred. Materials may be mixed, such as by using metal hemispheres on a polypropylene carrier. The shape of the carrier is not critical so long as the profile of the adaptor as viewed down the tape is greater at the axis of the hemispheres to prevent snagging.

INDUSTRIAL UTILITY

This invention is an adaptor which attaches to the lead end of a fish tape. When attached to the fish tape, this invention eliminates the drag and friction that the lead end of the fish tape encounters when it enters and passes through a bend in the pipe by replacing the blunt end of the fish tape with a roller that is designed to roll upon any contact at any position with the inner wall of the pipe or wire way. Although this invention will roll at any angle when contact is applied, the optimum roller position would be when both sides of the round roller engages the pipe wall. This invention attaches to the flat side of the fish tape to take maximum advantage of this natural positioning. This invention further eases the rotation of the roller using an inner bearing and/or Teflon® washer inserts on each side of the bearing to decrease friction.

In summary, the electrical installer can access double the degrees of bend with ease with this invention. This invention will give the installer much more flexibility in the placement of pull points, save money on labor, materials, and maintenance of electrical systems. While described in terms of conventional Cu and Al electrical wires, the device is adaptable to any other elongated article which is pulled through conduit, including but not limited to fibers and flexible tubes.

This invention has been described in terms of a best mode. Modifications obvious to one of skill in the art are included within the scope of the claims.

I claim:

1. An apparatus for attachment to a fish tape for running elongated flexible material through conduits comprising:
    a carrier having at a first end thereof an elongated flat section having a rounded end, a hole at about the midpoint of said first end and a second end having a slot slightly wider than a fish tape, a pivot around which a fish tape may be bent and a front wall;
    a pair of hemispheres, a first hemisphere having means for projecting an axle through said hole in said carrier and as second hemisphere having means for receiving and securing said axle.

2. An apparatus according to claim 1 wherein said axle is a bolt and said second hemisphere receives said bolt into a blind threaded bore.

3. An apparatus according to claim 1 wherein said axle is a projection from said first hemisphere and said second hemisphere receives said axle into a blind bore and secures said axle with an interference fit.

4. An apparatus according to claim 1 further comprising a means to reduce friction inserted into said hole in said carrier.

5. An apparatus according to claim 4 wherein said means to reduce friction is a bearing.

6. An apparatus according to claim 4 wherein said means to reduce friction is a bushing.

7. An apparatus according to claim 1 wherein said carrier and said hemisphere are formed from a material selected from the group consisting of metals, engineering plastics, wood, and ceramics.

8. An apparatus according to claim 7 wherein said carrier and said hemisphere are formed from engineering plastics.

* * * * *